UNITED STATES PATENT OFFICE.

KARL FARKAS, OF NEW YORK, N. Y., ASSIGNOR OF ONE-HALF TO GUY V. WILLIAMS, OF NEW YORK, N. Y.

METALLIC FILAMENTS FOR INCANDESCENT ELECTRIC LAMPS.

1,008,806.  Specification of Letters Patent.  Patented Nov. 14, 1911.

No Drawing.  Application filed August 9, 1909. Serial No. 511,882.

*To all whom it may concern:*

Be it known that I, KARL FARKAS, a citizen of the Kingdom of Hungary, and a resident of New York, in the county and State of New York, have invented certain new and useful Improvements in Metallic Filaments for Incandescent Electric Lamps, of which the following is a specification.

This invention has reference to a novel process of producing metallic filaments for incandescent lamps. It is the special object of my invention to produce metallic filaments which possess a high light emitting power and consume less watts per candle than those heretofore made.

It is essential for the good quality of such light producing conductors that they are free from impurities which impair the light emitting power or consume more current when the lamp is in operation.

One known method of producing metallic filaments consists in mixing fine powder of a highly refractory chemical element, oxid thereof or mixture of both, such as tungsten, molybdenum, osmium, chromium, iridium or ruthenium, etc. with glutinous substances in the well known manner, which substances act as binding materials. The metallic filaments thus prepared contain carbonaceous material because the glutinous substances are of organic origin. During the process of producing such filaments the glutinous substance is decomposed by heat and carbon set free which then forms part of the filament probably in form of a carbid. Carbon, as is well known, consumes about three times the electric current to become incandescent as the pure highly refractory chemical element of which the filament is essentially composed. Therefore the finished filament pressed out of fine powder of such highly refractory chemical element should be entirely free from carbon and certainly also from metal oxids in order to be highly efficient.

I have discovered that metallic filaments prepared with glutinous organic binders may be freed entirely from carbon by embedding them in metallic oxids which must be in form of fine powder and heating them therein to a high temperature. These filaments are embedded in a mixture of aluminum oxid and cerium oxid or they may be embedded in a mixture of aluminum oxid, magnesium oxid, and cerium oxid. During the process of heating, the glutinous substance is carbonized and decomposed and forms carbon in *statu nascendi* which, however, owing to the presence of the above oxids does not act on the highly refractory element of the filament but acts on the oxids and evidently forms carbon dioxid.

The proportions in which the oxids are employed are substantially as follows: About 90% of aluminum oxid is mixed with about 10% of cerium oxid or about 70% of aluminum oxid is mixed with about 20% of magnesium oxid and about 10% of cerium oxid. The heating of the filaments may take place either in common furnaces or in vacuum furnaces according to the composition of the above mentioned oxid mixtures and their components. The temperature is gradually raised to about 2200° F., or somewhat higher or lower according to the material of which the filament is composed and the composition and components of the oxid mixture. In this manner all the carbon is removed and the filaments become perfectly pure and entirely free from carbon. It is easily understood that the carbon in *statu nascendi* also acts on the filament if same is composed of or contains oxids of the highly refractory elements. The filaments thus obtained are then treated further in the usual manner.

Filaments produced according to the above described process, when finished, are entirely free from metallic oxids and carbon. They are of a homogeneous structure throughout and last longer under ordinary circumstances while their light emitting capacity is increased and less watts per candle are consumed during the operation of the lamps.

I claim as my invention:

1. The process of producing metallic filaments for incandescent electric lamps consisting in embedding shaped filaments of a highly refractory substance containing a glutinous organic binder in fine powder of oxid of the earthy metals, and heating said filaments under exclusion of the air to a high temperature to eliminate all the carbon and impurities.

2. The process of producing metallic filaments for incandescent electric lamps consisting in embedding shaped filaments of a highly refractory chemical element containing a glutinous organic binder in a mixture of oxids of the earthy metals, and heating same to about 2200° F. to eliminate the carbon and impurities.

3. The process of producing metallic filaments for incandescent electric lamps consisting in embedding shaped filaments of a highly refractory chemical element containing a glutinous organic binder in aluminum oxid mixed with some cerium oxid, and heating same to a high temperature to eliminate the carbon and impurities.

4. In process of producing metallic filaments for incandescent electric lamps prepared from a highly refractory substance and a glutinous organic binder the purification of said filaments by embedding them in a mixture of oxids of the earthy metals, and heating said filaments to a high temperature.

5. In process of producing metallic filaments for incandescent electric lamps prepared from fine powder of a highly refractory chemical element and a glutinous organic binder the purification of said filaments by embedding them in a mixture of oxids of the earthy metals, and heating said filaments therein under the exclusion of air to a high temperature.

6. In process of producing metallic filaments for incandescent electric lamps prepared from tungsten powder and a glutinous organic binder the purification of same by embedding said filaments in a mixture of aluminum oxid mixed with some cerium oxid, and heating said filaments to a high temperature.

7. In process of producing metallic filaments for incandescent electric lamps prepared from tungsten powder and a carbonaceous binder the purification of said filament by embedding them in a mixture of metallic oxids composed of about 90% of aluminum oxid and about 10% of cerium oxid and heating said filaments to about 2000° F. under the exclusion of air.

Signed at New York, N. Y., this 7th day of August, 1909.

KARL FARKAS.

Witnesses:
    LUDWIG K. BOHM,
    GUY V. WILLIAMS.